United States Patent [19]
Fowler

[11] 3,772,503
[45] Nov. 13, 1973

[54] COURSE DIFFERENCE LOGIC FOR USE WITH DIGITAL MAGNETIC COMPASS

[75] Inventor: John T. Fowler, Winthrop, Mass.

[73] Assignee: The Laitram Corporation, New Orleans, La.

[22] Filed: Nov. 22, 1972

[21] Appl. No.: 308,823

[52] U.S. Cl............ 235/150.5, 33/319, 235/150.26, 340/347 DD
[51] Int. Cl........................ G01c 17/02, G06f 15/50
[58] Field of Search.................... 235/150.5, 150.26, 235/150.27, 152; 340/347 AD, 347 DD; 33/317, 319, 352; 73/178; 244/77 B

[56] References Cited
UNITED STATES PATENTS 3,289,475 12/1966 Kenyon............................ 33/352 X
3,337,723 8/1967 Etnyre........................... 235/150.27
3,596,069 7/1971 Burt.............................. 235/150.27

Primary Examiner—Joseph F. Ruggiero
Attorney—Joseph Weingarten et al.

[57] ABSTRACT

Logic circuitry for use with a digital compass for providing an output indication of the difference between an actual and an intended course. Digital signals provided by a digital compass are processed in conjunction with a digital signal representation of intended course position to provide an output signal representing course difference and which can be employed by display or automatic pilot apparatus.

10 Claims, 7 Drawing Figures

_3,772,503_

COURSE DIFFERENCE LOGIC FOR USE WITH DIGITAL MAGNETIC COMPASS

FIELD OF THE INVENTION

This invention relates to digital magnetic compasses and more particularly, to logic circuitry for such compasses providing a remote digital indication of compass position and the difference between an intended and actual course.

BACKGROUND OF THE INVENTION

In copending application Ser. No. 284,362 of John T. Fowler entitled Magnetic Compass Having Remote Digital Readout, and assigned to the assignee of the present invention, digital compass logic circuitry is shown and described for providing an output indication of compass position in response to digital electrical signals detected from a coded compass disk. An optically sensible compass disk is employed having a predetermined sequence of Gray coded numbers providing single bit transitions between each number around the complete compass circle. The associated logic circuitry converts the detected Gray code into binary form for decoding of compass position. For many purposes, it is desirable to provide an output indication of the difference between an actual and intended course; for example, for use in automatic piloting systems to correct the course being steered. It is an object of the present invention to provide improved logic circuitry operative to provide such indications of course difference.

SUMMARY OF THE INVENTION

Briefly, the invention comprises logic circuitry operative to receive a first plurality of digital signals representing an actual course position and a second plurality of digital signals representing an intended course, and to provide an output indication of the difference between the two courses together with an indication of the sense of course error. The signals representing actual course are usually provided by a digital compass such as that shown in the copending application, identified above. The signal indication of the intended course can be provided by a manually operable course selector which can include an optically sensible disk similar to that employed in the digital compass and which is manually rotatable to positions that provide corresponding output indications of intended course positions.

The Gray coded digital signals provided by the compass are converted to binary form for subsequent processing by the logic circuitry. The most significant bit of the Gray code detected from the compass disk is, however, effectively inverted prior to binary conversion, this inversion offering an efficient means of transforming the detected Gray coded data into a format for subsequent processing. The inversion of the most significant bit of the detected Gray code provides a code which is the complement of the equivalent binary version of the detected Gray code. This converted binary number is then employed to preset a unidirectional binary counter operative under the government of a system clock to count to a predetermined final count which is detected by an associated decoder circuit. The decoder circuit, upon detection of the final count, provides an output signal to the system clock to cause discontinuance of the clock pulses. These pulses provided by the system clock serve as a serial output signal representative of actual course position. The output pulses from the system clock are applied as one input to a gating circuit, and are also applied to a second clock which provides clock pulses to a second unidirectional counter which is preset by a signal indication of intended course. Pulses from the second clock are also applied as an input to the gating circuit which provides an output representative of course difference between actual and intended course position.

DESCRIPTION OF THE DRAWINGS

The invention will be more fully understood from the following detailed description taken in conjunction with the accompanying drawings in which.

DETAILED DESCRIPTION OF THE INVENTION

Figure 1:
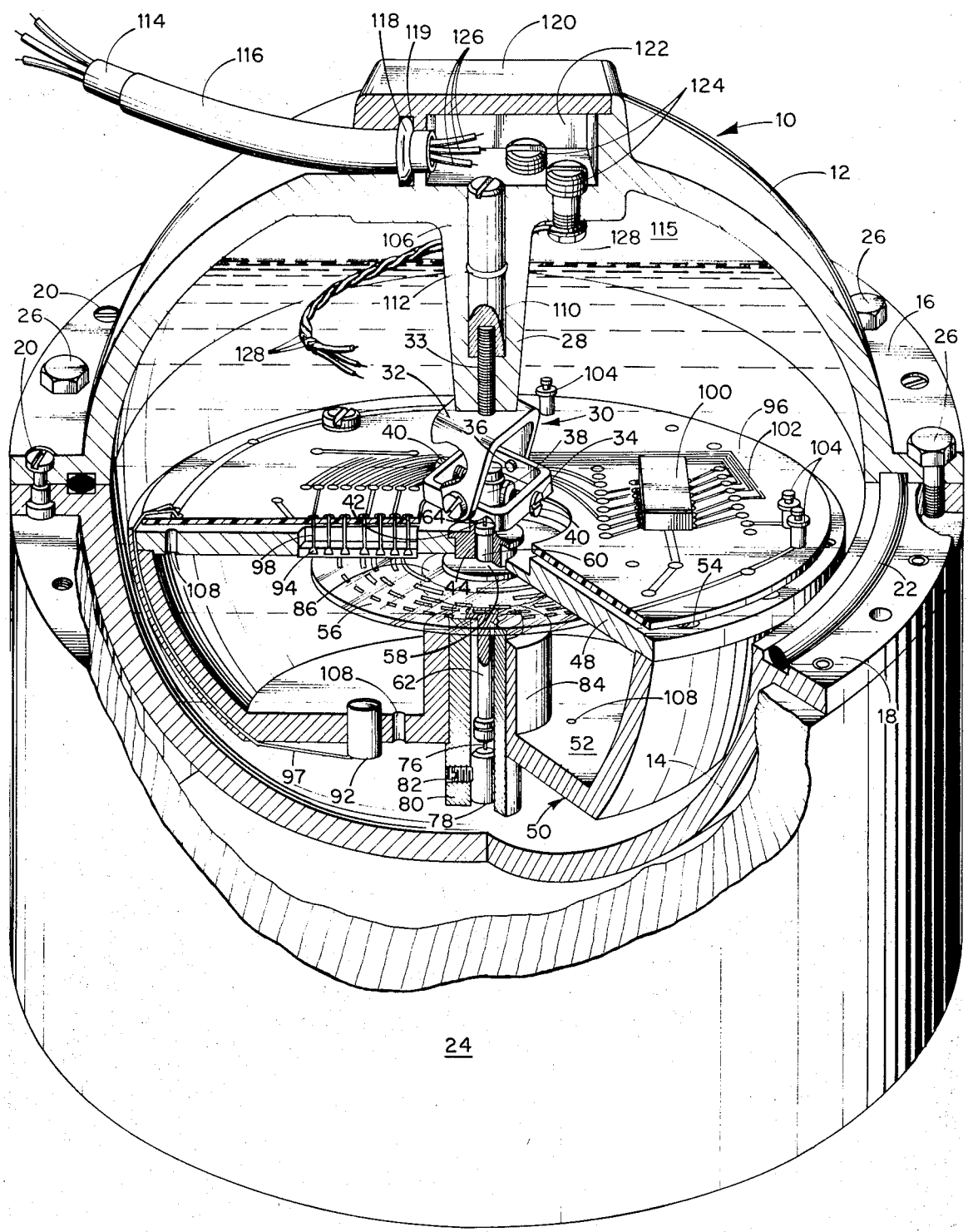
FIG. 1 is a cut-away pictorial view of a digital compass useful in the invention.

A digital compass operative to provide digital signals representing compass position and processed according to the invention is shown in FIG. 1 and is itself the subject of copending application Ser. No. 279,723, assigned to the assignee of the present invention. The compass includes a spherical housing 10 typically formed of upper and lower hemispheres 12 and 14, respectively, and with the confronting edges of the hemispheres terminating in respective flanges 16 and 18 which mate to form the overall housing. The hemispheres 12 and 14 of housing 10 are secured together by fasteners 20 provided through openings in flanges 16 and 18. An O-ring 22 or other suitable sealing element can be provided around the periphery of the mating surfaces of the respective hemispheres to provide a sealed enclosure to prevent leakage of damping liquid contained within the compass housing. The lower hemisphere 14 of housing 10 can be disposed within a cylindrical support 14 and secured thereto such as by fasteners 26 to provide a convenient base structure for mounting the compass for use in a marine vessel or other body in which it is to be employed.

A post 28 is provided at the top portion of hemisphere 12 and extends radially inward by an amount less than the full radius of the spherical enclosure. The post 28 can be integrally formed with hemisphere 12, as illustrated, or can be a separate element attached by any suitable mounting means. A gimbal assembly 30 is supported on the lower end of post 28 by a fastening screw 33, the gimbal assembly including a generally U-shaped member 32 fastened as shown to post 28 by screw 33 and supporting a first gimbal 34 by means of mounting pins 36 which define a first axis about which gimbal 34 is rotatable. A second gimbal 38 is disposed within gimbal 34 and supported by pins 40 which define a second axis orthogonal to the axis defined by pins 36 and about which gimbal 38 is rotatable.

The inner gimbal 38 includes a generally cylindrical collar portion which extends at right angles to the axis defined by pins 40 and which is employed to support the compass disk enclosure and associated code disk for rotation therein. The collar portion includes a generally cylindrical shaft 42 which terminates at its lower extremity in an enlarged end portion 44 which is affixed to the upper plate 48 of an annular enclosure 50. The enlarged portion 44 can be molded or otherwise secured to enclosure 50 to be integrally affixed for rotation therewith. The enclosure 50 is typically formed by a cup section 52 with the circular top plate 48 secured to the periphery of cup 52 such as by machine screws 54. The enclosure 50 is thereby suspended from the gimbal assembly 30 for maintenance of a generally horizontal disposition in the presence of motion experienced by housing 10.

The code disk 56 is formed of a light transmissive material such as glass or plastic and is affixed to a centrally disposed hub 58 which has oppositely extending shafts 60 and 62. The upper shaft 60 supports a cylindrical pin 64 which cooperates with a bearing mounted within the collar portion. The lower shaft 62 contains a pin 76 which cooperates with a bearing provided in cylindrical member 78 which is secured within an opening in cylindrical post 80 and secured therein by a set screw 82. The post 80 is affixed to enclosure 50 by means of a centrally disposed flange portion 84. The compass disk 56 is thus supported for rotation by its respective bearings which are adjusted to permit free rotation of the disk about the bearing axis.

A cylindrical magnet 86 is provided around hub 58 and is concentrically disposed with respect to disk 56 and secured in engagement with the bottom surface thereof by any suitable means. The magnet has a magnetic axis aligned with the north-south axis of the disk. The cylindrical magnet is preferable in maintaining the mass of the rotatable compass structure near the center of rotation to minimize the torque necessary to cause disk rotation and thereby enhance compass sensitivity. In an alternative embodiment, one or more bar magnets can be provided in association with code disk 56. The code disk 56 is free to rotate about its axis to a position determined by the interaction of magnet 86 with the earth's magnetic field to define a compass position which, as will be described, is electro-optically sensed to provide a plurality of digital electrical signals for processing and display.

The compass structure is fabricated of suitable non-magnetic materials. In a typical implementation the housing 10 is formed of a plastic material such as LEXAN, while the gimbal assembly 30 is fabricated of brass, as is the hub 58 and associated disk supporting structure.

Figure 2:
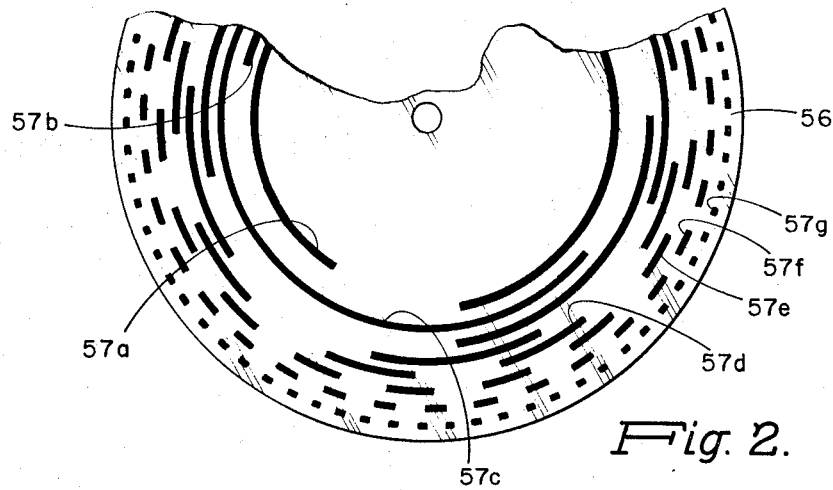
FIG. 2 is a cut-away plan view of a code disk employed in the compass of FIG. 1.

The coded disk 56 is illustrated more fully in FIG. 2 and is fabricated of a light transmissive material, such as glass or plastic, and has provided on a surface thereof a plurality of concentric tracks each having a different predetermined number of alternately light transmissive and opaque segments. Each track is coded to represent one bit of a multiple bit code, the number of tracks being selected to accommodate the intended compass resolution. In the illustrated embodiment, nine concentric tracks, 57a–57i, are provided to produce nine bit codes representing each degree of the 360° of the code disk. The innermost track 57a contains one opaque segment which occupies 180° thereof, the other 180° segment being light transmissive, this track serving as the most significant bit of the multiple bit code. The successive tracks 57b–57i extending outwardly of the disk contain different numbers of alternately light transmissive and opaque segments which represent successive bit positions of the multiple bit code sensed at each angular position of the disk with respect to the sensor array 94. The code disk per se is well known in the optical angle encoder art and need not be described at length in the present application.

A Gray or other cyclic binary code is employed having a sequence of code values such that transitions between each Gray code equivalent of adjacent compass positions is accomplished with only a single bit change in the detected code including the transition between 0° and 359°. The provision of a code having single bit transitions between each degree position throughout the compass circle is especially advantageous in implementing the logical circuitry and in minimizing the ambiguous sensing of adjacent codes which can arise if the code disk is positioned with the photosensor array aligned between adjacent degree positions. By use of Gray coding, the possible error or ambiguity is limited to only a single bit or 1° in the embodiment described. In the illustrated embodiment, Gray code values are employed corresponding to desired numerals from 76 to 435. The Gray code equivalent of decimal 76 represents a 0° compass reading, while a Gray code equivalent of decimal 435 represents a 359° reading.

A light emitting diode 92 or other suitable illumination source is provided in the bottom wall of cup 52 in a position to direct light through the coded tracks of disk 56 and connected to a circuit board 96 by wires 97. Light transmitted through disk 56 is received by a photosensor array 94 affixed to plate 48 of enclosure 50 and which includes a linear array of photocells each in light receiving relationship with a respective track of disk 56 and each operative to provide a respective output signal of a first value in response to light received from a transmissive portion of the associated code track and of a second value in response to the absence of light received from an occluded portion of that code track. The array 94 thereby produces a plurality of digital signals which represent the coded equivalent of the compass position as determined by the angular disposition of disk 56 with respect to the compass housing 10.

The photosensor array 94 is connected to a printed circuit board 96 by means of leads 98, this circuit board also including associated electronic circuitry typically in the form of one or more integrated circuit modules 100 which are interconnected to array 94 and to terminal posts 104 by etched conductive paths 102. In a preferred embodiment only three terminal posts need be employed for power, ground and data connections, respectively. Other terminal arrangements can, of course, be provided as is well known in the electronics art. Employment of a small number of terminals is, however, advantageous in minimizing the number of interconnecting wires or paths which must be coupled from the compass circuitry to the output cable. The circuit board 96 is mounted on plate 48 of enclosure 50 and is immersed in the damping liquid of housing 10 which provides a stabilized thermal environment for the electronic components.

The cup portion 52 of enclosure 50 typically includes a rounded sidewall which conforms to the curvature of hemisphere 14 and which is spaced therefrom by a predetermined amount. In operation, the housing 10 and enclosure 50 are both filled with a damping liquid, such as water, to provide a separate damping environment for disk 56 and enclosure 50 and for gimbal assembly 30. The housing 10 is filled typically by means of a filling port 106 formed in post 28. Liquid enters enclosure 50 by means of one or more passages or openings 108 provided, for example, through the bottom and top walls of cup portion 52. A plug 110 is threaded onto screw 33 as a closure for port 106 and is sealed for example by an O-ring 112 provided around a circumferential channel in plug 110, as shown.

The enclosure 50 is completely filled with damping liquid while the housing 10 is substantially filled, leaving a small amount of air space 115 to provide room for liquid expansion under varying termperature conditions. The disk 56 is preferably of substantially smaller diameter than that of enclosure 50 by an amount such that swirling of liquid near the periphery of enclosure 50 will not materially affect disk 56. In the illustrated embodiment, the disk 56 has a diameter of two inches while the internal diameter of enclosure 50 at its largest dimension is 4 inches. The specific dimensions are, of course, a matter of choice dependent upon the particular operating characteristics and specifications desired.

Electrical connection is made to the compass electronics by means of a cable 114 secured for example by means of a sealing sleeve 116 which terminates in a ring 118 disposed within a channel 119 provided in the upper portion of housing 10. A cover 120 encloses a junction box 122 which includes terminal posts 124 each having an upper portion within the junction box for connection to respective wires 126 of cable 114, and a lower portion within hemisphere 12 to which connecting wires 128 are couples from respective terminal posts 104. The interconnecting wires 128 can be braided together and are arranged in a path such as around post 28 as shown, to provide slack sufficient to not impede the free rotation of enclosure 50.

Considering the operation of the invention in a typical environment aboard a ship, the compass housing 10 is installed such as by base 24 at any suitable position in the vessel and with the sensor array 94 aligned along or parallel to the longitudinal axis of the vessel. The display of compass heading is usually provided at a position remote from the compass structure itself since the electrical output signals can be transmitted readily to remote locations. Since the compass rotor is not visually viewed, the compass structure can be mounted at various locations which would be unsuitable for conventional visually readable compasses. The compass can, for example, be located in the hold of a ship or even at locations at which rolling, pitching and yawing motions are exaggerated since the compass disk is well damped by its enclosing fluid, while the disk enclosure and supporting gimbal assembly are also dumped by the separate liquid medium of housing 10.

Figure 3:
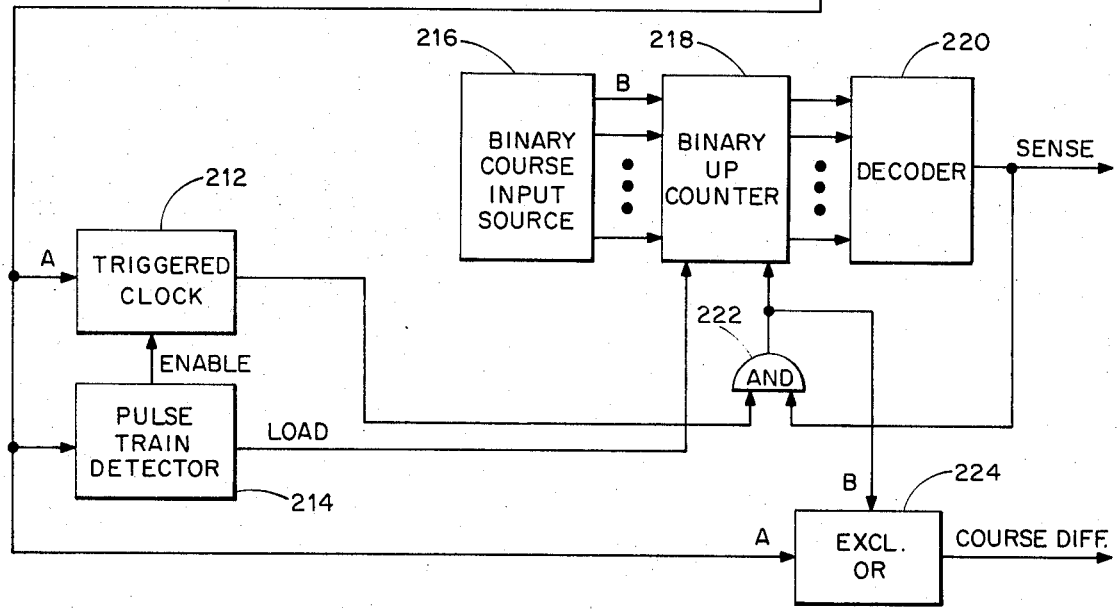
FIG. 3 is a block diagram representation of logic circuitry embodying the invention.

The logic circuitry of the invention is illustrated in FIG. 3 and is operative in response to digital signals received from the compass and from digital signals received from an intended course input source to provide an output indication of the difference between actual and intended course. The photosensor array 94 provides a plurality of digital signals representing the Gray code sensed from disk 56, and these signals are applied to a Gray-to-binary converter 200. The digital signal representing the most significant bit of the detected Gray code is applied to converter 200 by way of an inverter 202 to provide inversion of this most significant bit. The output signals of converter 200 are applied to a binary up-counter 204, the output of which is applied to a decoder 206.

The inversion of the most significant bit by inverter 202 of the code applied to converter 200 causes a binary output from the converter which is the complement of the equivalent binary number represented by the Gray-coded signal read from the code disk. The inversion of the most significant bit of the code applied to converter 200 effectively inverts the entire applied code by operation of the Gray-to-binary converter. The converter itself is well known in the electronics art, a typical implementation being described in Electronic Analog-to-Digital Conversion, H. Schmid, Van Nostrand, Reinhold Co. (1970) pages 312–313. The reciprocal relationship between the input Gray code and the converted binary output of converter 200 offers particular advantages in terms of efficient and relatively simple logical processing. Such reciprocal code relationship allows use of a unidirectional counter which is a less complex circuit than a reversible or bidirectional counter, which would otherwise be required. Also, the reciprocal code relationship permits the generation of a direct output representative of course position without additional conversions of the code. The inversion of the most significant bit of the input Gray code can alternatively be provided by inversion of the code segments on the most significant bit track of the code disk, rather than by electronic inverter 202 in the associated logic circuitry.

A fast clock 208 is enabled by a slow clock 210 and provides clock signals to counter 204 for governing the counting operation. The slow clock 210 determines the sampling rate at which the course positions are processed, and provides a load command to enable the entry of data into counter 204. The output signal from decoder 206 is applied as a stop signal to fast clock 208 to discontinue the clocking operation thereof. This output signal, which is in the form of a train of one or more pulses, is representative of the actual course position as detected by the digital compass and is applied to a triggered clock 212 and to a pulse train detector 214. The pulse train provided by clock 208 can also be applied to an output display or other utilization apparatus for indication of actual compass heading.

A course input source 216 provides a plurality of digital signals which represent an intended course and which are applied to a binary up-counter 218. The output signals from counter 218 are applied to a decoder 220. The clock 212 applies clock signals via an AND gate 222 to counter 218, and as one input to an exclusive OR gate 224. The gate 224 also receives as an input the pulse train provided by clock 208. The output signal from decoder 220 is applied as an input signal to gate 222, and also serves as an output indication of the sense of course difference. The magnitude of course difference is indicated by the pulse signals from OR gate 224.

Figure 4:
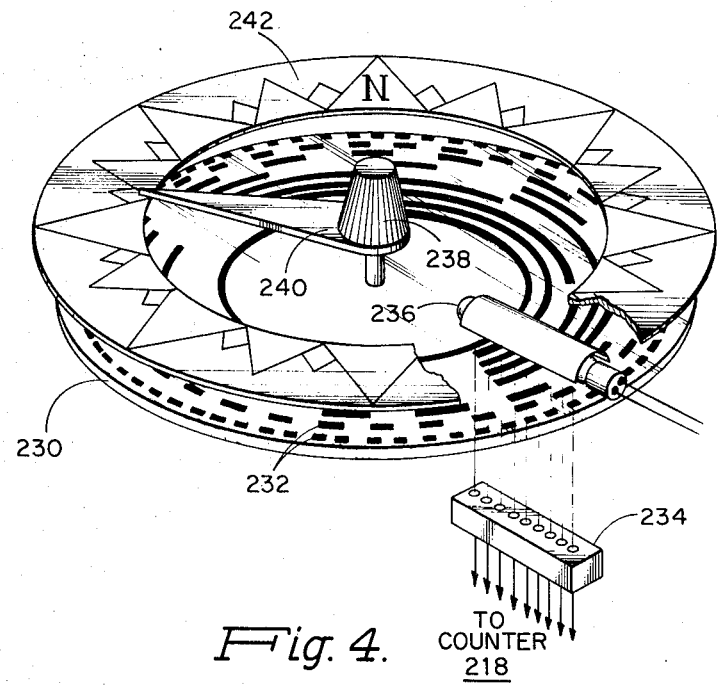
FIG. 4 is a diagrammatic representation of an intended course encoder, useful in the invention.

The binary course input source is typically a manually adjustable device for selecting an intended course and for providing a binary signal representation of the selected course. An embodiment of such an input source is illustrated in FIG. 4 and includes a light transmissive disk 230 having a plurality of multiple bit binary codes thereon defined by a plurality of concentric tracks 232 each having a different number of alternately light transmissive and opaque segments. The disk is supported for rotation relative to a photosensor array 234 which is disposed along a radius of the disk and which includes a plurality of photosensors each operative to sense light received from a respective track 232. A light source such as lamp 236 is provided adjacent the opposite surface of disk 230 as array 234 for illuminating the several tracks of the disk. In the illustrated embodiment, the disk is manually rotatable by means of a knob 238 having affixed thereto a pointer 240 which indicates the selected course heading depicted on associated visually readable scale 242. For each angular position of disk 230, a multiple bit signal is provided by array 234 representative of the selected course. The disk 230 provides the same resolution as the compass disk, which is 1° in the embodiment under discussion.

During operation, the code disk will be at an angular position in accordance with the earth's magnetic field such that the photosensor array 94 is aligned with respect to the disk to provide a plurality of output signals representing the compass heading in Gray-coded form. These signals are applied to the Gray-to-binary converter 200 with the most significant bit thereof inverted by inverter 202 prior to its application to the converter. The binary coded output of converter 200 is applied to up-counter 204, which under the control of clock pulses provided by fast clock 208, causes the counter to be loaded with the number provided by converter 200 and to increment the counter to a predetermined final count which is then sensed and decoded by decoder 206.

In the implementation described, the counter 204 operates to a final count which is the binary equivalent of decimal 435 which is detected by decoder 206 and which provides, upon such detection, a stop signal to fast clock 208 to discontinue its operation. The decoder 206 is typically a NAND gate for receiving the input signals representing the number to be decoded. The number of pulses provided by fast clock 208 to counter 204 is equal to the difference between the initial and final counts of counter 204 and is of a number equal to the measured course in degrees. The number of pulses representing the compass course is a matter of choice depending upon system requirements. For example, decoder 206 can be operative to detect the binary equivalent of decimal 436 which will permit fast clock 208 to produce output pulses of a number one higher than the measured course. The extra pulse is useful typically to reset an associated display of compass position. The counter 218 and decoder 220 are the same as counter 204 and decoder 206 and operate similarly. The counter 218 is loaded with a binary count from input source 216 and operates to a predetermined final count, the binary equivalent of decimal 435, detected by decoder 220. This decoder provides, upon detection of the final count, an output signal which is operative to stop the incrementing of counter 218, and as a sense indication of course difference.

The triggered clock 212 operates at its own rate in the absence of an overriding signal received from clock 208. In the presence of such a received signal, the clock output is forced to operate at the rate of the received signal. The counter 218 can only operate during the time interval permitted by the load signal from detector 214, and during this interval, the counter can increment from the initial count entered from source 216 to either the count sensed by decoder 220 or the highest count which is within the enabling interval, whichever first occurs. The enabling interval is sufficient to allow processing of the greatest possible course difference.

Figure 5:
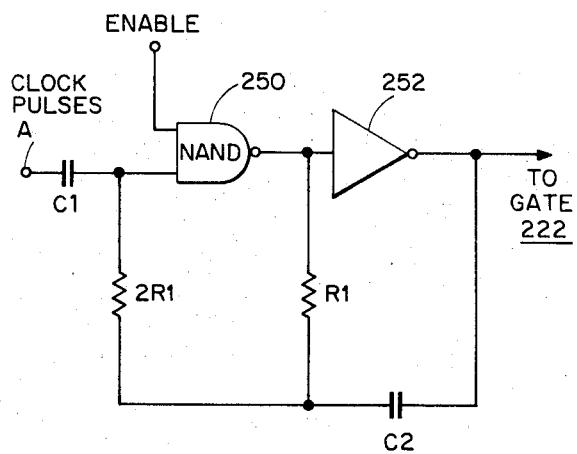
FIG. 5 is a schematic diagram of a triggered clock useful in the invention.

The triggered clock is typically implemented by the circuit of FIG. 5 which includes a NAND GATE 250 receiving the enable signal from pulse train detector 214 and clock pulses (A) via a coupling capacitor C1. The output of gate 250 is coupled to an inverting amplifier 252, the output of which provides the clock signals for gate 222. A feedback path is provided across inverter 252 by a capacitor C2 and a resistor R1, while a feedback path across gate 250 is provided by resistor R1 and a resistor 2R1. In the absence of clock pulses (A) from fast clock 208, the circuit operates at a frequency essentially determined by the combination of resistor R1 and capacitor C2 and which is somewhat slower than the frequency of these pulses. In the presence of clock pulses (A) which serve to override the normal clocking operation of the circuit, pulses are provided by gate 252 at a faster rate corresponding to the rate of the received pulses.

Upon receipt of clock pulses from fast clock 208, the pulse train detector 214 generates a load signal to permit the entry into counter 218 of a binary code from source 216 representing an intended course. The pulse train detector also enables triggered clock 212 for provision of clock pulses to counter 218 via AND gate 222. The AND gate is enabled by the output signal of decoder 220 which is present at one binary level until the time the decoder detects the predetermined final count of counter 218. The exclusive OR circuit 224 receives, as one input, the pulse train from clock 208, and as a second input, the pulses provided by AND gate 222. It will be appreciated that the exclusive OR circuit 224 provides an output pulse only when one or the other of its input signals is present and thus is effective to provide an output indication of the difference between its received input signals and representing the difference between an actual and intended course.

The triggered clock 212 provides an output pulse for each pulse received from clock 208, and counter 218 is incremented a number of times represented by the number of pulses received from clock 208. In the absence of pulses (A) applied to clock 212 by clock 208, the triggered clock provides output pulses so long as the enable signal is present from detector 214. Clock pulses are thus provided by clock 212 for the duration of the time interval defined by the load signal from detector 214.

Figure 6A:
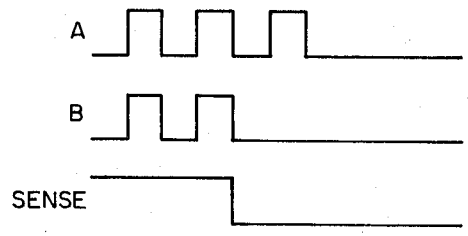
FIGS. 6A and 6B show waveforms useful in illustrating operation of the invention.

As an example, assume that an actual course sensed by the digital compass is 3°, and the intended course to be steered by a vessel is 2°. With reference to FIG. 6A, the pulse train A provided by fast clock 208 representing the actual course will contain three pulses. The pulse train B from AND gate 222 will contain two pulses representing the intended course. The exclusive OR gate 224 will provide an output pulse only when a pulse is applied to either but not both of the inputs thereof, and since pulses are present in the first and second pulse positions of respective pulse trains A and B, gate 224 will provide no output during reception of these pulses. However, the third pulse of pulse train A is present at a time when no pulse is provided by pulse train B, and gate 224 thus provides one output pulse indicative of a 1° course difference. The output signal from decoder 220 changes from a first to a second logic level upon receipt of the detectable final count from counter 218. This second logic level present during the output pulse from gate 224 indicates the sense of the course difference, being in this case the actual less the intended course.

Figure 6B:
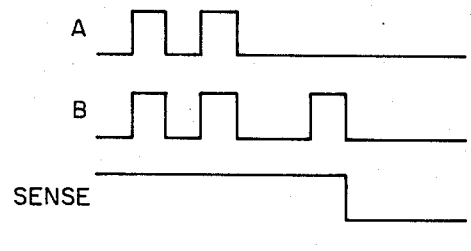

Assume now that the actual course is 2° while the intended course is 3°. Operation of the invention is similar to that described immediately above except that the sense signal from decoder 220 will denote that the intended course is greater than the actual course. As seen in FIG. 6B, the sense signal will change from a first to a second logic level after production of the third pulse of pulse train B which is after the production of the output pulse from gate 224. The sense signal therefore is of a first logic level during the presence of the course difference signal to denote that the course difference represents the intended less the actual course.

It will be appreciated that the invention is not limited to the particular implementations shown and described. For example, the logic circuitry of the invention is not limited to use with magnetic compasses alone, but is more generally useful for the processing of digital signals provided by other types of angle encoders or other devices wherein the difference between digital codes is desired. Accordingly, it is not intended to limit the invention by what has been particularly shown and described except as indicated in the appended claims.

What is claimed is:

1. For use with a compass providing Gray coded signals representative of compass headings, logic circuitry operative in response to said signals to provide an output indication of course difference comprising:
   converter means for converting said signals to binary coded signals representing a binary code which is the complement of the binary equivalent of a received Gray code from said compass;
   first unidirectional binary counter means;
   means for presetting said first counter means with a binary number representative of an actual course sensed by said compass;
   first clock means for providing first clock pulses to increment said first counter means from said preset binary number to a predetermined count;
   first decoder means coupled to the output of said first counter means and operative in response to said predetermined count to provide an output signal operative to stop operation of said first clock means;
   said first clock pulses being of a number representative of actual compass heading;
   second unidirectional binary counter means;
   means for presetting said second counter means with a binary number representative of an intended course;
   second clock means for providing second clock pulses to increment said second counter means for the number entered therein to a predetermined count;
   second decoder means operative in response to the predetermined count from said second counter means to provide an output signal operative to stop provision of said second clock pulses; and
   logic circuit means operative in response to said first and said second clock pulses to provide course difference output pulses of a number representative of the difference between said actual and intended courses;
   said output signal from said second decoder means being of a value during production of said course difference pulses representative of the sense of course difference.

2. For use with a compass providing Gray coded signals representative of compass headings, logic circuitry operative in response to said signals to provide an output indication of course difference comprising:
   converter means for converting said signals to binary coded signals representing a binary code which is the complement of the binary equivalent of a received Gray code from said compass;
   a first unidirectional binary counter receiving the binary output signals from said converter means;
   first decoder means coupled to the output of said counter and operative to provide an output signal in response to a predetermined count therefrom;
   first clock means for providing clock pulses to increment said counter from the binary number entered therein to a predetermined higher count at which said first decoder means is responsive;
   said decoder output signal being operative to stop operation of said first clock means;
   the clock pulses provided by said first clock means being of a number representative of an actual compass course;
   means for providing a binary signal representation of an intended course;
   a second unidirectional binary counter receiving the binary signals from said intended course means;
   second decoder means coupled to the output of said second counter and operative to provide an output signal in response to a predetermined count therefrom;
   pulse detector means operative in response to the clock pulses from said first clock means to provide a load signal to said second counter and an enable signal;
   second clock means enabled by said enable signal and operative in response to the clock pulses from said first clock means to provide corresponding clock pulses for said second counter and also operative in the absence of received clock pulses from said first clock means to provide clock pulses for said second counter so long as said enable signal is present;
   first gate means receiving the clock pulses from said second clock means and the output signal from said second decoder means and operative to apply clock pulses to said second counter means;
   second gate means receiving the clock pulses from said first clock means and from said first gate means and operative to provide output pulses of a number representative of the difference between said actual and intended courses;
   the output signal from said second decoder means having a binary value during the production of said course difference pulses representative of the sense of course difference.

3. The invention according to claim 2 wherein said Gray coded signals represent a selected code sequence of Gray coded values which provide unambiguous transition throughout the compass circle.

4. The invention according to claim 2 wherein said Gray coded signals represent a sequence of Gray coded values corresponding to decimal numbers from 76 to 435, The invention the Gray coded equivalent of decimal 76 representing a compass heading of 0°, the Gray coded equivalent of decimal 435 representing a compass heading of 359°.

5. The invention according to claim 2 wherein said converter means includes:
   a Gray-to-binary converter; and
   means for inverting the signal representing the most significant bit of said Gray code prior to application of said bit to said Gray-to-binary converter.

6. The invention according to claim 2 wherein said first clock means includes;
   a first clock operative at a predetermined rate for providing said clock pulses; and
   a slow clock operative at a predetermined lower rate than the rate of said first clock and operative to control the sampling rate at which signals are processed.

7. The invention according to claim 5 wherein said second clock means includes:
   a triggered clock circuit operative in the presence of said enable signal to provide clock pulses at a predetermined rate, and operative in the presence of said enable signal and clock pulses received from said first clock means to provide clock pulses at a faster rate equal to the rate of said received clock pulses.

8. The invention according to claim 7 wherein said pulse detector means includes:
   a pulse train detector operative to provide said load and enable signals for the duration of the clock signals received from said first clock means and for a predetermined further interval sufficient to permit processing of the greatest possible course difference.

9. The invention according to claim 8 wherein said second gate means includes:
   an exclusive OR gate operative to provide an output pulse only in the presence of either a clock pulse from said first clock means or said first gate means, thereby to provide said output pulses of a number representative of course difference.

10. The invention according to claim 9 wherein said first gate means includes:
    a AND gate operative in the presence of an output signal from said second decoder means of first binary level to apply clock pulses to said second counter means and said second gate means.

* * * * *

UNITED STATES PATENT OFFICE
CERTIFICATE OF CORRECTION

Patent No. 3,772,503          Dated November 13, 1973

Inventor(s) John T. Fowler

It is certified that error appears in the above-identified patent and that said Letters Patent are hereby corrected as shown below:

Column 2, line 46, "support 14" should read --support 24--.

Column 5, line 61, "course" should read --courses--.

Column 10, line 64, "transition" should read --transitions--.

Claim 4, line 65, "Theinvention" should read --The invention--.

Claim 4, line 68, delete "The invention".

Claim 6, lines 12 and 15, "first clock" should read --fast clock--.

Signed and sealed this 21st day of May 1974.

(SEAL)
Attest:

EDWARD M.FLETCHER,JR.
Attesting Officer

C. MARSHALL DANN
Commissioner of Patents